United States Patent
Vornehm et al.

(10) Patent No.: US 11,090,855 B2
(45) Date of Patent: Aug. 17, 2021

(54) MACHINE FOR EXPANDING PLASTIC CONTAINERS WITH SHUT-OFF VALVE BETWEEN PRESSURE GENERATING DEVICE AND FILLING DEVICE

(71) Applicant: KRONES AG, Neutraubling (DE)

(72) Inventors: Andreas Vornehm, Offenberg (DE); Dieter Finger, Neutraubling (DE); Thomas Kitzinger, Regensburg (DE); Dominik Meier, Parsberg (DE); Christian Betz, Geigant (DE); Cora Hanesch, Regensburg (DE); Andreas Pense, Regensburg (DE)

(73) Assignee: KRONES AG

( * ) Notice: Subject to any disclaimer, the term of this patent is extended or adjusted under 35 U.S.C. 154(b) by 232 days.

(21) Appl. No.: 16/215,513

(22) Filed: Dec. 10, 2018

(65) Prior Publication Data
US 2019/0291330 A1    Sep. 26, 2019

(30) Foreign Application Priority Data
Mar. 22, 2018   (DE) ...................... 10 2018 106 779.8

(51) Int. Cl.
*B29C 49/46*    (2006.01)
*B29C 49/58*    (2006.01)
(Continued)

(52) U.S. Cl.
CPC .............. *B29C 49/46* (2013.01); *B29C 49/06* (2013.01); *B29C 49/58* (2013.01); *B29C 49/783* (2013.01);
(Continued)

(58) Field of Classification Search
CPC . B29C 49/46; B29C 2049/4664; B29C 49/58; B29C 2049/5803; B29C 2049/5858
See application file for complete search history.

(56) References Cited

U.S. PATENT DOCUMENTS

| | | | |
|---|---|---|---|
| 8,573,964 B2 | 11/2013 | Andison et al. | ........ B29C 49/58 |
| 8,944,805 B2 | 2/2015 | Chauvin et al. | .... B29C 49/4268 |

(Continued)

FOREIGN PATENT DOCUMENTS

| | | |
|---|---|---|
| CN | 102725122 | 10/2012 |
| CN | 103260853 | 8/2013 |

(Continued)

OTHER PUBLICATIONS

Extended European Search Report (w/machine translation of relevant portions) issued in application No. 18211217.7, dated Jul. 3, 2019 (7 pgs).

(Continued)

*Primary Examiner* — Robert B Davis
(74) *Attorney, Agent, or Firm* — Hayes Soloway P.C.

(57) ABSTRACT

A machine for expanding plastic parisons into plastic containers by a liquid medium with at least two transforming stations. These transforming stations fill and expand the plastic parisons with the liquid medium, with at least one pressure generating device. This pressure generating device is suitable and intended to deliver the liquid medium to at least one filling device which fills the plastic parisons with the liquid medium, wherein at least one shut-off device is installed in at least one connection channel between the pressure generating device and the filling device, inside which the liquid medium is conveyed. This shut-off device is configured and provided in order that a fluid path inside the connection conduit can be at least partially interrupted.

19 Claims, 2 Drawing Sheets

(51) Int. Cl.
  *B29C 49/06* (2006.01)
  *B29C 49/78* (2006.01)
  *B65B 3/02* (2006.01)
  *B67C 3/26* (2006.01)
  *B29L 31/00* (2006.01)
  *B29C 49/12* (2006.01)

(52) U.S. Cl.
  CPC ............... *B65B 3/022* (2013.01); *B67C 3/26* (2013.01); *B29C 49/12* (2013.01); *B29C 2049/4664* (2013.01); *B29C 2049/5803* (2013.01); *B29L 2031/7158* (2013.01)

(56) References Cited

U.S. PATENT DOCUMENTS

| | | | |
|---|---|---|---|
| 9,180,621 B2 | 11/2015 | Sato et al. | B29C 49/58 |
| 9,498,913 B2 | 11/2016 | Haesendonckx et al. | B29C 49/46 |
| 10,377,075 B2 | 8/2019 | Toyoda et al. | B29C 49/46 |
| 10,857,718 B2 | 12/2020 | Gillet | B29C 49/42 |
| 2011/0135778 A1* | 6/2011 | Andison | B29C 49/783 425/524 |
| 2012/0315350 A1 | 12/2012 | Andison et al. | 425/524 |
| 2013/0113143 A1 | 5/2013 | Fevre et al. | B29D 22/003 |
| 2014/0367895 A1* | 12/2014 | Sato | B65B 3/022 264/532 |
| 2015/0328824 A1* | 11/2015 | Morikami | B29C 49/12 425/524 |
| 2016/0082644 A1* | 3/2016 | Chauvin | B29C 49/58 428/36.92 |
| 2017/0158361 A1* | 6/2017 | Desoutter | B29C 49/46 |
| 2017/0225934 A1 | 8/2017 | Chauvin et al. | B67C 3/222 |
| 2017/0291345 A1 | 10/2017 | Toyoda et al. | B29C 49/10 |

FOREIGN PATENT DOCUMENTS

| | | | |
|---|---|---|---|
| CN | 104159722 | 11/2014 | |
| CN | 204296012 | 4/2015 | |
| CN | 107073798 | 8/2017 | |
| DE | 2502170 | 7/1976 | B29C 49/70 |
| EP | 2143544 | 1/2010 | B29C 49/12 |
| EP | 2801470 | 11/2014 | |
| EP | 3169525 | 9/2018 | B41J 2/175 |

OTHER PUBLICATIONS

German Search Report (w/machine translation) issued in application No. 10 2018 106 779.8, dated Feb. 11, 2019 (15 pgs).
Chinese Office Action issued in application No. 201811486446.4(w/ translation) dated Nov. 2, 2020 (24 pgs).

* cited by examiner

MACHINE FOR EXPANDING PLASTIC CONTAINERS WITH SHUT-OFF VALVE BETWEEN PRESSURE GENERATING DEVICE AND FILLING DEVICE

BACKGROUND OF THE INVENTION

The present invention relates to a machine and a method for expanding plastic parisons into plastic containers. Such machines and methods have been known for a long time from the prior art. In this case heated plastic parisons are usually first of all expanded with compressed air and then the bottles thus produced are filled with a product. More recently, however, procedures have also become known in which the plastic parisons are not initially expanded with compressed air, but in which the plastic parisons are directly filled with a liquid medium, in particular the product to be introduced.

In the moulding of containers or bottles with filling material, however, the problem arises that, for moulding, more filling material must be used than will later actually remain in the container. Therefore gas must enter the so-called head space of the containers, in order to set a so-called filling level (edge between filling material and head space gas). Depending upon technical necessity, different or various filling levels may be necessary. Thus an adjustability with simultaneous reproducibility of the respective filling level should be guaranteed.

For shaping the containers with a liquid medium which subsequently remains in the container, in the prior art a mould unit is used which is basically made up of two assemblies. These assemblies are defined by a filling cylinder and a filling head. In the past the filling cylinder was designed to be single-acting and is supplied with the liquid medium by means of a supply line from a central liquid reservoir.

The feed conduit between the central liquid reservoir and the filling cylinder can be shut off by a shut-off device. If the filling cylinder is filled, the shut-off device is closed and the flow is shut off. In the moulding process the liquid product is pressed out of the filling cylinder into the filling head. The connection between the filling cylinder and the filling head is designed with at least one channel.

The flow from the filling cylinder to the filling head is possible at any time. Before the moulding process the filling head sits on the mould and seals the interface to the preform.

The filling head is tightly closed by a sealing stopper. After the setting of an initial pressure in the filling head the sealing stopper is opened. The shaping process begins with this step, wherein the preform is transformed into a container by the action of the liquid medium and the stretching rod.

However, this method which is known from the prior art has some disadvantages.

Because of the configuration of the preform as a hollow body, there is a specific volume therein before each moulding process. During the inflow of the liquid this gas volume rises up into the filling head because of the sealing conditions. Since the connection between the filling head and the filling cylinder is not designed to be shut off, a part of the gas volume rises unhindered into the filling cylinder.

As the process progresses, the gas volume in the cylinder increases. Since the piston position and the piston stroke in the cylinder remain constant over all cycles, after several filling cycles the volume of the liquid medium in the filling cylinder drops, wherein the gas volume increases. Due to this effect the filling volume of the container deviates from the desired state and the formed container is reject.

In addition, in the process the pressure profile is controlled by the movement path of the piston. Since gases are compressible media, with the same movement path of the piston no reproducible pressure buildup or pressure profile can be ensured. However, a defined pressure profile in the container is necessary for the shaping of the container. The pressure fluctuations lead in turn to a poor container quality and thus to rejection.

Since during the pressure holding time, which is required for precise shaping of the container, the container pressure must be permanently maintained by the pressure generating device, the period until the filling of the filling cylinder for the next cycle is extended by the pressure holding time. This time period thus leads to an extension of the cycle time. This leads to a reduced output capacity and thus to productivity losses for the user.

Therefore the object of the present invention is to provide a machine and a method which eliminates the above-mentioned problems, so that a machine is provided which makes it possible over all filling cycles to keep a constant filling level with the shortest possible filling duration.

SUMMARY OF THE INVENTION

A machine according to the invention for expanding plastic parisons into plastic containers by means of a liquid medium has at least one transforming station which fills and expands the plastic parisons with the liquid medium. Furthermore, the machine has at least one pressure generating device, which is suitable and intended to deliver the liquid medium to at least one filling device. This filling device fills the plastic containers with the liquid medium. In this case the pressure generating device has a pressure output which at least intermittently can be fluidically connected to the plastic parison to be filled.

According to the invention at least one shut-off device is installed in at least one connection channel between the pressure generating device and the filling device, inside which the liquid medium is conveyed. This shut-off device is configured and provided in order that a fluid path inside the connection conduit can be at least partially interrupted, in particular so that the filling device and/or the pressure generating device can be degassed.

For example the filling device and the pressure generating device can be degassed independently of one another.

The shut-off device can be a valve which can be controlled and/or regulated. For example the shut-off device can be controlled and/or regulated in such a way that a pressure generation between the filling device and the pressure generating device can be set, in particular regulated, in a targeted manner. For example, such a regulated shut-off device replaces an otherwise separately installed pressure regulating device, for example in a filling head of the filling device. It is then conceivable for example that a sealing stopper in the filling head can be omitted. The sealing stopper can be the sealing element installed in the filling head for pre-pressure generation. With a shut-off device regulated in such a way, the process control can be taken over at least in part.

For example, in particular no further pressure buildup takes place after the closure of the shut-off device. The filling head is for example decoupled from the actual pressure generating device.

In this case after conclusion of the filling operation the shut-off device is preferably completely closed, so that subsequently the pressure generating device can be filled again for a new filling operation.

The free-flowing medium is preferably the liquid to be filled. This liquid can be an "easy-flowing" liquid such as water, juices, milk, beers or wines. However, the liquid can also be viscous liquids such as sauces, oils or the like. In addition, the liquid to be introduced can be both carbonated liquids and also non-carbonated liquids. In particular the flowable medium can be different from a gas, for example from nitrogen.

It is pointed out that the terms "plastic container" and "plastic parison" are in some instances used synonymously. This is because the plastic parison is transformed by the transforming process described here into the plastic container and therefore during the filling process it is not always possible to speak clearly of a plastic parison or a plastic containers.

The plastic containers to be expanded and to be filled are preferably containers which are produced from a material selected from a group of materials including PET, HDPE, PP and the like. The containers to be expanded and filled are preferably bottles.

The flowable medium is advantageously a liquid medium and preferably the filling material.

Due to the shut-off device in the connection channel, between the pressure generating device and the filling device (in particular between the filling cylinder and the filling head) the fluid behaviours in the two assemblies can be decoupled.

As a result, the return flow of the gas from the filling head into the pressure generating device can be prevented. Using the example of the filling head, regardless of the state of the pressure generating device degassing can be performed with the aid of the degassing apparatus.

The pressure generating system can be degassed by the degassing apparatus, which preferably represents the maximum point of the fluid leading system.

The degassing of the system leads to a reproducible volume delivery into the preform and thus increases the process reliability.

Furthermore, due to the invention it can be ensured that with a constant piston travel path a reproducible pressure buildup takes place. Thus it is ensured that the container is shaped with reproducible quality. In this way the ejection of defective containers can be prevented and the productivity of the apparatus is increased.

Due to the fluidic decoupling of the pressure generating device from the filling head by means of the shut-off device, the pressure holding time which is crucial for the shaping of the container can be decoupled from the pressure generation. For this purpose the shut-off device is closed after the setting of the holding pressure. Due to the decoupling of the pressure generating device from the filling head it is possible to parallelise individual process workflows, such as for example providing a holding pressure and generating pressure for a subsequent cycle. Thus with the shut-off device closed, a holding pressure can be provided in the container and simultaneously a pressure for a subsequent cycle can be built up by the pressure generating device.

If the pressure generating device is for example a piston device, the filling cylinder can be filled during the pressure holding time. This leads to a shortening of the process time and increases the productivity of the machine.

The productivity can be increased by means of for example a double-acting mode of operation of the piston, since no unproductive return stroke takes place.

Furthermore, a further moulding station can be supplied with the filling medium by the for example double-acting piston, so that it is possible to save on half of the number of filling cylinders.

A further advantage which can result for example from a double-acting mode of operation of the piston is the assistance of the piston drive in the filling cylinder by the initial pressure of a fluid pump which conveys the filling medium to the filling cylinder. This results in savings with regard to energy consumption.

The pressure generating device preferably has a piston element which is movable relative to a liquid chamber. This piston element can, by its movement with respect to this liquid chamber, on the one hand, generate the pressure of the liquid which expands the container and on the other hand can generate a negative pressure relative to another portion of the receiving chamber which in turn can be used to draw off liquid. The piston element preferably divides the liquid chamber into two portions.

In a preferred embodiment, in a vertical direction above the highest point, relative to the height of an inflow region of a filling head of the filling device, at least one degassing apparatus is fluidically connected by means of a venting channel to the inflow region, so that by means of or due to the degassing apparatus a gas from the plastic parison can escape during the filling.

According to at least one embodiment the degassing apparatus comprises at least one sensor which is configured and provided in order to distinguish between the gas or the filling medium, so that by means of the degassing apparatus the gas can be separated from the filling medium.

In a preferred embodiment the device has a movable carrier on which the transforming stations are disposed. This movable carrier is advantageously a carrier which is rotatable relative to an axis of rotation. Particularly preferably a plurality of transforming stations are arranged on the carrier. Thus for example between 5 and 60 transforming stations can be arranged on this carrier. It is pointed out that the transforming stations preferably also serve as filling stations.

In a further preferred embodiment the filling device has an application device which can be applied to the rim of the mouth of the plastic parisons in order to fill them with the liquid medium (and in order in particular also to expand them). Advantageously in this case this filling device rests sealingly on the rim of the mouth of the respective plastic parison. Furthermore, the filling device can have valve devices in order to control the delivery of the product into the plastic parisons. In this case it is also possible that during an expansion operation the liquid is conveyed with different pressures and/or different volume flows into the plastic parisons.

In a preferred embodiment the individual transforming stations also have transforming moulds, inside which the plastic parisons are expanded by application of the liquid medium. In this case these transforming moulds can be opened and closed, wherein the expansion of the plastic parisons is possible in a closed operation. In this case it is possible that these transforming moulds have mould parts which are pivotable with respect to one another and in particular are pivotable with respect to one another with respect to an axis. This axis extends for example parallel to the longitudinal direction of the plastic parison.

In a further advantageous embodiment the machine has a receiving device for a liquid medium removed from the container. In this case the receiving device can be an additional reservoir, inside which an extracted medium can be stored temporarily. In addition to or alternatively to the reservoir the liquid can, however, also be stored in pipe sections.

Thus it is possible that, the liquid is stored in a tank if required. In the event of an impermeable container, here too a collapse of the container can be initiated or, however, in the event of a vented container the required amount of filling material can be drawn off. The amount of filling material which then accumulates in a collection container can for example either be fed by means of a valve or an outlet to a product bowl, for example a collecting device for the product, or can also be used in other ways.

In a further advantageous embodiment the machine has a rod-like body for expanding the containers, wherein this rod-like body preferably has a channel for conveying the liquid medium.

In this way a hollow stretching rod can be used, through which in particular the liquid medium or in particular the product can be introduced. Alternatively the stretching rod can also be designed "not" to be hollow.

In a further advantageous embodiment the machine has a further receiving container to receive the liquid medium. This further receiving container is advantageously arranged below the plastic container to be expanded. By means of this further receiving container a siphon effect can also be used in particular to draw off liquid from the container.

In a further advantageous embodiment this further receiving container is at least intermittently fluidically connected to the container to be expanded and/or to a further container to be expanded in another transforming station.

In a further advantageous embodiment the machine has a pumping device which serves as a pressure generating device.

Preferably an infeed to the pressure application device is provided, by means of which in particular the liquid to be introduced is fed to the pressure application device. This infeed preferably has a valve device in order to control the delivery of liquid to the pressure application device. This valve can be closed in order to enable the filling process of introducing the liquid into the container.

Furthermore, the present invention is directed to a method for expanding plastic parisons into plastic containers by means of a liquid medium and in particular by means of a filling to product, having at least one transforming station, which fills and expands the plastic parisons with the liquid medium. In this case at least one pressure generating device is provided, which delivers the liquid medium by means of a filling device, which then fills the plastic parisons with the liquid medium. In this case the pressure generating device has a pressure output which at least intermittently is fluidically connected to the plastic parison to be filled.

According to the invention at least one shut-off device is installed in at least one connecting channel between the pressure generating device and the filling device, inside which the liquid medium is conveyed, wherein the shut-off device at least partially interrupts a fluid path inside the connection conduit, so that the filling device and/or the pressure generating device can be degassed.

According to at least one embodiment an internal container pressure inside the plastic parison can be increased and/or decreased by a movement of the stretching rod for expansion of the plastic parison. In this case the stretching rod can have an at least partially continuous channel along its longitudinal direction, through which a fluid can be discharged or can be delivered into the plastic parison.

In other words, in the enclosed state (intermediate valve and recirculating valve closed) pressure can be reduced in particular also in the plastic container by movement of the stretching rod, in order to decrease the flow speed in the recirculation direction and to reduce the influence of the switching times. The pressure is reduced by a concomitant volume reduction during the return movement of the stretching rod inside the plastic parison and/or inside the plastic container. The recirculating valve serves to direct product out of the mould head again. Thus for example the filling level in the container can be set. It is also possible to flush the mould head.

Moreover, it is conceivable that at least one, preferably at least two holding pressures can be set by means of such position or pressure control.

According to at least one embodiment, the filling device and/or the pressure generating device can be degassed and/or process times of the filling device and the pressure generating device can be parallelised. This can mean a synchronisation of the two devices with regard to the process times thereof.

For example a method proposed here can be carried out by means of a machine as described above.

Further advantages and embodiments are disclosed by the appended drawings.

DETAILED DESCRIPTION OF THE INVENTION

Figure 1:
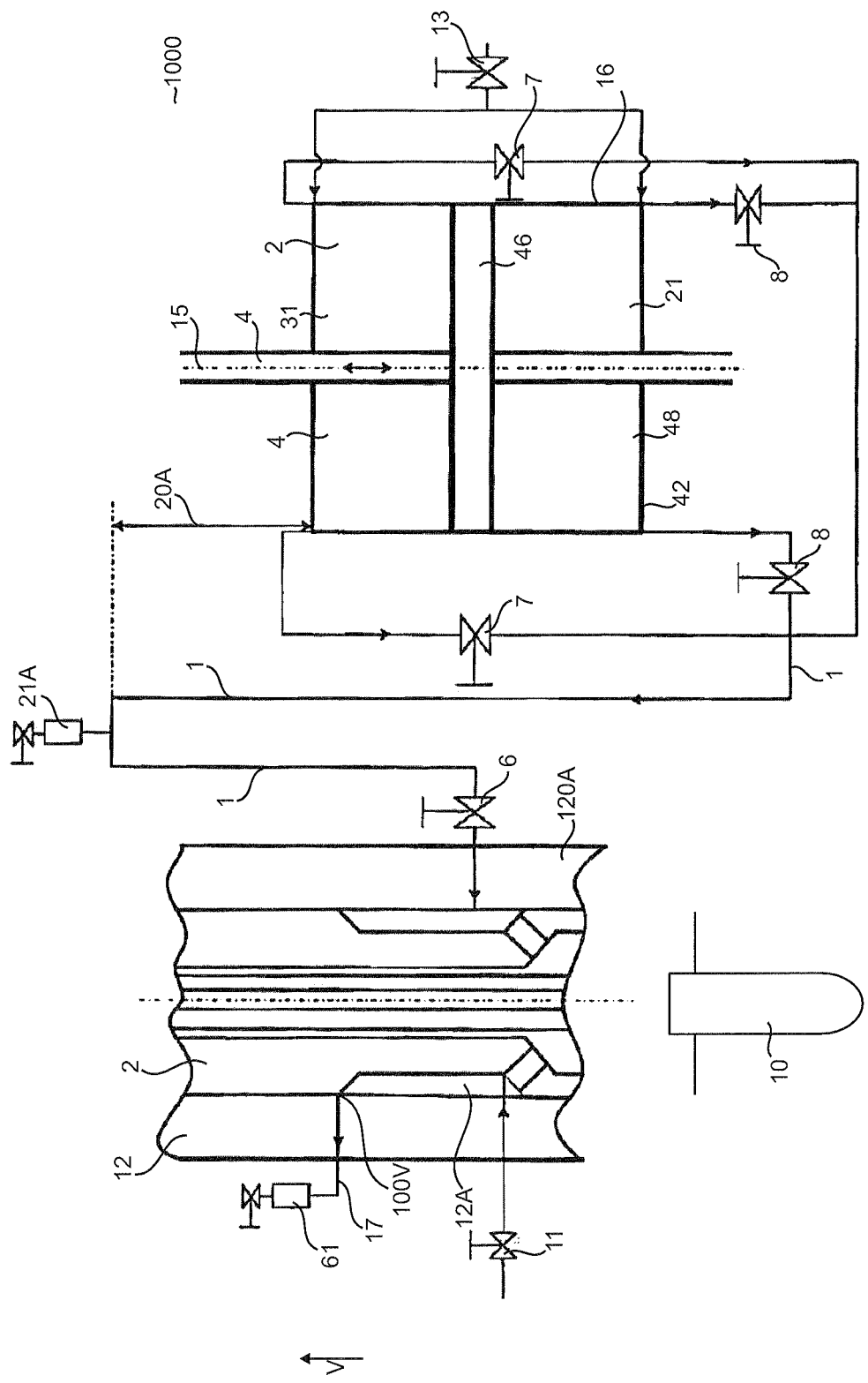
FIG. 1 shows a schematic representation of a machine according to the invention.

FIG. 1 shows a schematic representation of a machine 1000 according to the invention for expanding plastic parisons into plastic containers 10 by means of a liquid medium, having at least one transforming station 2, which fills and expands the plastic parisons with the liquid medium with at least one pressure generating device 4, which is suitable and intended to deliver the liquid medium to at least one filling device 12, which fills the plastic parisons with the liquid medium, wherein the pressure generating device 4 has a pressure outlet 42 which at least intermittently can be fluidically connected to the plastic parison to be filled.

A shut-off device 6 is installed in a connection channel 1, between the pressure generating device 4 and the filling device 12 inside which the liquid medium is conveyed, wherein the shut-off device 6 is configured and provided in order that a fluid path inside the connection channel 1 can be at least partially interrupted, in particular so that the filling device 12 and/or the pressure generating device 4 can be degassed.

The pressure generating device 4 has a piston 46 which is movable in the vertical direction V relative to a liquid chamber 48, in order thus to convey the liquid by means of a pressure outlet 42 via the connection channel 1 to a filling device designated as a whole by 12. Starting from the filling device 12 the liquid enters the container 10. The filling device 12 preferably serves simultaneously as a pressure application device, in order to apply a pressure to the plastic parisons in order to expand them. In this case, however, the pressure generating device 4 is preferably different from a pressure application device, since a pressure application device merely applies a pressure to another element, for example a preform, but does not, at least does not substantially, generate it.

In a vertical direction V above the highest point 100V relative to the height of an inflow region 12A of a filling head 120A of the filling device 12, at least one degassing apparatus 61 is fluidically connected by means of a venting channel 17 to the inflow region 12A, so that by means of or due to the degassing apparatus 61 a gas from the plastic parison can escape during the filling.

In the present invention the exemplary machine 1000 shown in FIG. 1 can be inter alia a combination of a filling head 120A and a filling cylinder 16, wherein both components can be degassed independently of one another.

The filling cylinder 16 is connected by means of the supply line to a supply container in which the liquid medium is stored.

A piston 46 which is movable inside the filling cylinder 16 can be designed to be either single-acting or double-acting. The piston 46 is sealed against a cylindrical housing of the filling cylinder 16 and moves along a cylinder axis 15. If one of the cylinder chambers 21 or 31 reduced in size by the piston movement, liquid is forced out of this chamber into the filling head 120A.

Depending upon the direction of movement, either the shut-off devices 7 or 8 is closed, so that a movement of fluid from one cylinder chamber to the other is interrupted.

The controllable shut-off device 6 which can interrupt the fluid flow between the filling cylinder 16 and the filling head 120A is installed in the connection channel 1 which connects the filling cylinder 16 to the filling head 120A.

In this case in the present exemplary embodiment the connection is interrupted by the piston movement after the single-stage pressure buildup and so the pressure is kept constant in the filling head 120A. The filling head 120A and the filling cylinder 16 are now decoupled from one another.

As already addressed above, the venting channel 17 is arranged at the highest point of the inflow region 12A in the filling head 120A and branches off in the vertical direction V, so that the gas which is present rises further upwards and finally is guided to the degassing apparatus 61 in which with the aid of a sensor or a mechanical device gas is distinguished from the filling medium and is separated from the filling medium.

After the shaping of a container, the gas volume from the preform from the preceding cycle is located in the filling head 120A. The filling head 120A can be filled independently of the filling cylinder 16 by the connection to a storage container by means of the connection channel 1 and the valve 11 with the shut-off device 6 opened. The valve 11 can be a flushing valve. The connection channel 1 is preferably on a lower vertical level than the venting channel 17.

During filling of the filling head 120A with the pressurised liquid, the gas is forced through the venting channel 17 into the degassing apparatus 61 and delivered to the environment, so that after this operation there are no gas residues in the filling head 120A.

The gas volume which is located in the filling cylinder 16 at the start of the process is extracted by means of the degassing apparatus 61. The degassing apparatus 61 has, preferably always, a vertical spacing 20A of greater than zero relative to the highest point of the filling cylinder 16 and/or relative to the inflow region 12.

The reference numeral 21A designates a quick venting valve, by means of which air is prevented from flowing into the pressure generating device 4. The reference numeral 13 designates a shut-off device by which the inflow of the liquid medium from a product tank (not shown) can be controlled.

Figure 2:
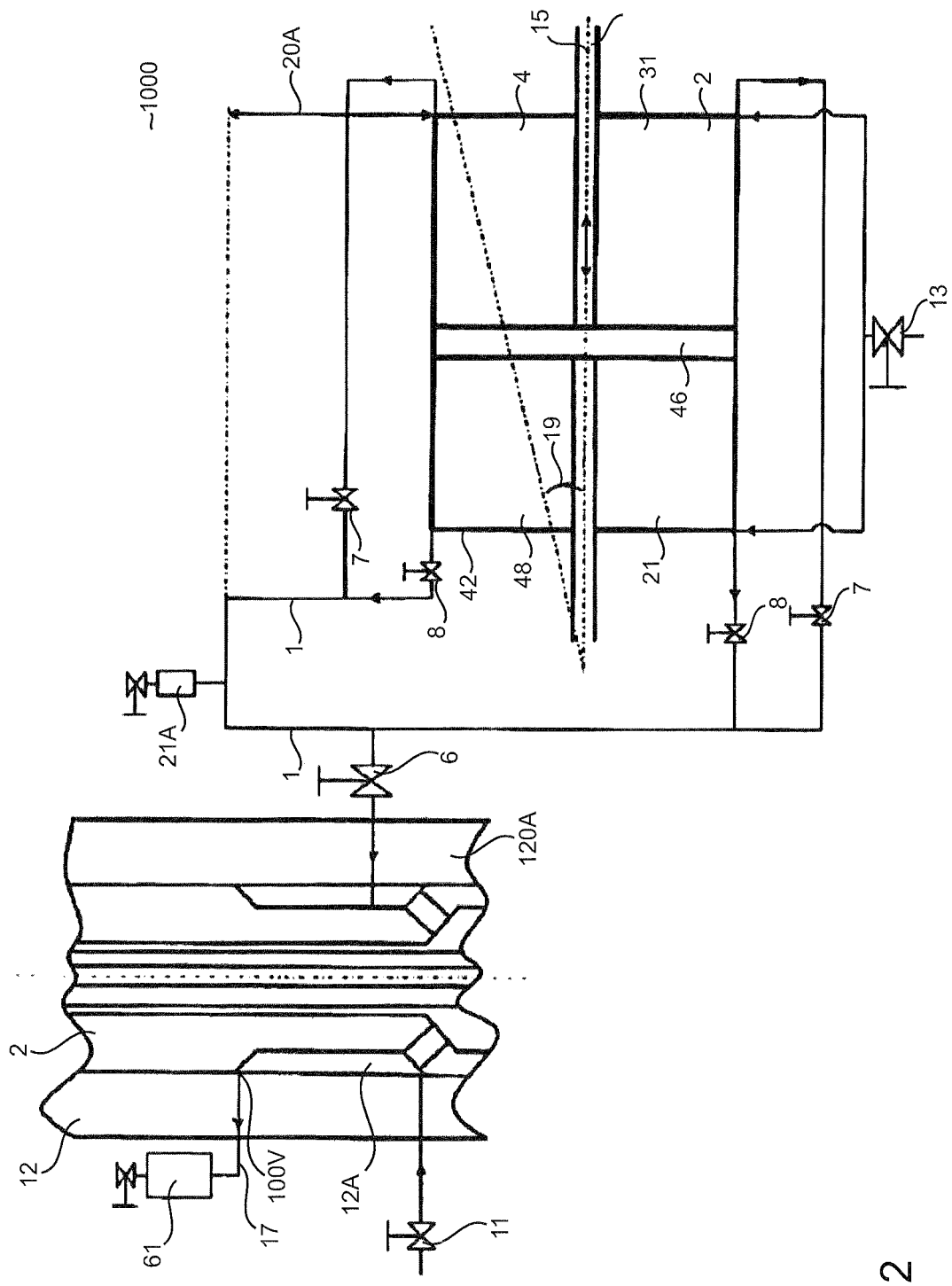
FIG. 2 shows a detail of a machine according to the invention which is modified relative to FIG. 1.

In contrast to FIG. 1, FIG. 2 shows that the piston axis 15 is arranged at an angle 19 to a horizontal plane, wherein the angle 19 is smaller than or equal to 90 degrees. In this case the liquid medium can be conveyed through a chamber (not shown), in order to replace an exiting volume of air by the liquid medium. Alternatively or in addition a stretching rod could also undertake the pressure regulation and move deeper into the plastic container if the pressure drops due to the venting.

The applicant reserves the right to claim all the features disclosed in the application documents as essential to the invention in so far as they are individually or in combination novel over the prior art. Furthermore it is pointed out that in the individual drawings features were also described which may be advantageous per se. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCES 1 connection channel
2 transforming station
4 pressure generating device
6 shut-off device
7 shut-off device
8 shut-off device
10 plastic container
11 valve
12 filling device
12A inflow region
13 shut-off device
15 cylinder axis/piston axis
16 filling cylinder
17 venting channel
20A vertical spacing
21 cylinder chamber
21A quick venting valve
31 cylinder chamber
42 pressure outlet
46 piston
48 liquid chamber
61 degassing apparatus
100V highest point
120A filling head
1000 machine
V vertical direction

The invention claimed is:

1. A machine for expanding plastic parisons into plastic containers by a liquid medium, having at least one transforming station, which fills and expands the plastic parisons with the liquid medium with at least one pressure generating device, which is configured to deliver the liquid medium to at least one filling device, which fills the plastic parisons with the liquid medium, wherein the pressure generating device has a pressure output which at least intermittently can be fluidically connected to the plastic parison to be filled, wherein at least one shut-off device is installed in at least one connection channel, between the pressure generating device and the filling device inside which the liquid medium is conveyed, wherein the shut-off device is configured and provided in order that a fluid path inside the connection channel can be at least partially interrupted; and wherein in a vertical direction above a highest point relative to a height of an inflow region of a filling head of the filling device, at least one degassing apparatus is fluidically connected by a venting channel to the inflow region, so that due to the degassing apparatus a gas from the plastic parison can escape during the filling.

2. The machine according to claim 1, wherein the degassing apparatus comprises at least one sensor which is configured and provided in order to distinguish between the gas or the filling medium, so that the gas can be separated from the filling medium by the degassing apparatus.

3. The machine according to claim 1, wherein the pressure generating device has a piston element which is movable relative to a liquid chamber.

4. The machine according to claim 1, wherein the machine has a movable carrier on which the transforming stations are arranged.

5. The machine according to claim 1, wherein the connection channel is arranged at a lower vertical height than the venting channel, so that during filling of the filling head under pressure, the gas is forced through the venting channel into the degassing apparatus and delivered to the environment, so that after this operation there are substantially no longer any gas residues in the filling head.

6. The machine according to claim 1, wherein a piston axis of the piston element is oriented at an angle deviating from zero with respect to a vertical direction.

7. The machine according to claim 1, wherein the machine has a closing device configured to close a flow path of the liquid medium from the container.

8. The machine according to claim 1, wherein the pressure generating device has a pumping device.

9. The machine according to claim 1, wherein an internal container pressure inside the plastic parison can be increased and/or decreased by a movement of the stretching rod for expansion of the plastic parison.

10. The machine according to claim 1, wherein the filling device and/or the pressure generating device can be degassed and/or process times of the filling device and the pressure generating device can be parallelised.

11. A method of expanding plastic parisons into plastic containers using a machine as claimed in claim 1, wherein-at least one shut-off device is installed in at least one connection channel, between the pressure generating device and the filling device inside which the liquid medium is conveyed, which shut-off device at least partially interrupts a fluid path inside the connection channel in at least one mode of operation.

12. The machine according to claim 2, wherein the connection channel is arranged at a lower vertical height than the venting channel, so that during filling of the filling head under pressure, the gas is forced through the venting channel into the degassing apparatus and delivered to the environment, so that after this operation there are substantially no longer any gas residues in the filling head.

13. The machine according to claim 3, wherein the connection channel is arranged at a lower vertical height than the venting channel, so that during filling of the filling head under pressure, the gas is forced through the venting channel into the degassing apparatus and delivered to the environment, so that after this operation there are substantially no longer any gas residues in the filling head.

14. The machine according to claim 4, wherein the connection channel is arranged at a lower vertical height than the venting channel, so that during filling of the filling head under pressure, the gas is forced through the venting channel into the degassing apparatus and delivered to the environment, so that after this operation there are substantially no longer any gas residues in the filling head.

15. The machine according to claim 3, wherein a piston axis of the piston element is oriented at an angle deviating from zero with respect to a vertical direction.

16. The machine according to claim 3, wherein a piston axis of the piston element is oriented at an angle deviating from zero with respect to a vertical direction.

17. The machine according to claim 4, wherein a piston axis of a piston element is oriented at an angle deviating from zero with respect to a vertical direction.

18. The machine according to claim 5, wherein a piston axis of a piston element is oriented at an angle deviating from zero with respect to a vertical direction.

19. A machine for expanding plastic parisons into plastic containers by a liquid medium, having at least one transforming station, which fills and expands the plastic parisons with the liquid medium with at least one pressure generating device, which is configured to deliver the liquid medium to at least one filling device, which fills the plastic parisons with the liquid medium, wherein the pressure generating device has a pressure output which at least intermittently can be fluidically connected to the plastic parison to be filled, wherein at least one shut-off device is installed in at least one connection channel, between the pressure generating device and the filling device inside which the liquid medium is conveyed, wherein the shut-off device is configured and provided in order that a fluid path inside the connection channel can be at least partially interrupted, said machine further comprising a filling head, and at least one degassing apparatus fluidly connected by a venting channel to an inflow region of the filling head, wherein the connection channel is arranged at a lower vertical height than the venting channel, so that during filling of the filling head under pressure, gas is forced through the venting channel into the degassing apparatus and delivered to the environment, so that after this operation there are substantially no longer any gas residues in the filling head.

* * * * *